United States Patent
Beall et al.

Patent Number: 6,077,796
Date of Patent: *Jun. 20, 2000

[54] LOW CTE-LOW POROSITY CORDIERITE BODIES AND METHOD OF MAKING SAME

[75] Inventors: Douglas M. Beall, Painted Post; Gregory A. Merkel, Big Flats, both of N.Y.

[73] Assignee: Corning Incorporated, Corning, N.Y.

[*] Notice: This patent is subject to a terminal disclaimer.

[21] Appl. No.: 09/197,266

[22] Filed: Nov. 20, 1998

Related U.S. Application Data

[60] Provisional application No. 60/067,156, Dec. 2, 1997.
[51] Int. Cl.$^7$ .................................................. C04B 35/195
[52] U.S. Cl. ................................. 501/9; 501/118; 501/119
[58] Field of Search ............................... 501/9, 118, 119, 501/153

[56] References Cited

U.S. PATENT DOCUMENTS

| | | |
|---|---|---|
| 4,194,917 | 3/1980 | Sakemi et al. . |
| 4,292,083 | 9/1981 | Rauch, Sr. . |
| 4,300,953 | 11/1981 | Lachman . |
| 4,495,300 | 1/1985 | Sano . |
| 4,576,919 | 3/1986 | Hodge . |
| 4,722,916 | 2/1988 | Watanabe et al. . |
| 4,772,580 | 9/1988 | Hamanaka et al. . |
| 4,810,681 | 3/1989 | Hayakawa . |
| 4,869,944 | 9/1989 | Harada et al. . |
| 4,877,670 | 10/1989 | Hamanaka . |
| 5,030,398 | 7/1991 | Hamanaka et al. . |
| 5,030,592 | 7/1991 | Komarneni et al. . |
| 5,114,644 | 5/1992 | Beall et al. . |

*Primary Examiner*—Paul Marcantoni
*Attorney, Agent, or Firm*—L. Rita Herzfeld

[57] ABSTRACT

Low expansion, low porosity cordierite bodies having a CTE at 25–800° C. of <4×10-7C-1 and total porosity of <20%, or CTE of >4×10-7C-1 but <9×10-7C-1 and total porosity of <12%, or a CTE of >9×10-7C-1 but <15×10-7C-1 and total porosity of <10%. They are produced by selecting cordierite-forming raw materials in specific combinations of talc, spinel, kaolin, calcined kaolin, Al2O3-forming material, MgO-forming materials, and silica, in various particle size combinations. The raw materials are intimately blended with an effective amount of vehicle and forming aids and plastically shaped into a green body that is dried and fired at a temperature of about 1370° C. to 1435° C. Firing schedules vary according the raw material combination.

8 Claims, No Drawings

LOW CTE-LOW POROSITY CORDIERITE BODIES AND METHOD OF MAKING SAME

This application claims the benefit of U.S. provisional application No. 60/067,156, filed Dec. 2, 1997, entitled LOW CTE-LOW POROSITY CORDIERITE BODIES AND METHOD OF MAKING SAME, by Douglas M. Beall and Gregory A. Merkel.

This invention relates to making cordierite bodies having high thermal shock resistance by virtue of a low coefficient of thermal expansion (CTE) and low gas permeability as the result of a very low total porosity, and optionally a fine mean pore size. This is accomplished by use of selected combinations of raw materials and firing schedules.

BACKGROUND OF THE INVENTION

Honeycomb ceramics having a high thermal shock resistance and low permeability have been proposed for use as rotary heat exchangers (regenerators) for gas turbines and other heat engines, where leakage of hot gas must be minimized. A low-CTE material having low porosity and a very fine mean pore size would also exhibit an improved strength, which could be advantageous as an automotive catalytic converter substrate having very thin walls and a high cell density (cells/unit area) designed for reduced back pressure and increased geometrical surface area. A number of approaches to produce a low-porosity cordierite body have been proposed. None have achieved the desired combination of low CTE and very low porosity, and many require the use of sintering additives that can reduce the refractoriness or the stable firing range of the ceramic body.

The present invention fills the need for a low expansion low porosity cordierite body.

SUMMARY OF THE INVENTION

In accordance with one aspect of the invention, there is provided low expansion, low porosity cordierite bodies having a CTE at 25–800° C. of <4×10-7C-1 and total porosity of <20%, or CTE of >4×10-7C-1 but <9×10-7C-1 and total porosity of <12%, or a CTE of >9×10-7C-1 but <15×10-7C-1 and total porosity of <10%. The body composition is in about 49% to 53% $SiO_2$, about 33% to 38% $Al_2O_3$ and about 12% to 16% MgO.

In accordance with another aspect of the invention, there is provided a method of producing the above-described bodies that involves selecting cordierite-forming raw materials from the following combinations.

A first combination is talc, spinel, and kaolin, and optionally calcined kaolin, and silica, with the mean particle diameter of the kaolin being less than about 4 micrometers. The sum of amount of calcined kaolin and non-colloidal silica is less than about 10 wt. %, and the total weight percent of $P_2O_5$ contributed by all raw materials being less than about 0.1%.

A second combination is talc, kaolin, and MgO-forming material, and optionally $Al_2O_3$-forming component, spinel, and silica. The amount of non-colloidal silica is less than about 10 wt. %, the amount of $Al_2O_3$-forming component is less than about 10% when the mean particle diameter of the $Al_2O_3$-forming component is greater than about 2 micrometers. The total weight percent of $P_2O_5$ contributed by all raw materials is less than about 0.1%.

A third combination is talc, $Al_2O_3$-forming component, and one or more of the components of kaolin, calcined kaolin, and silica, with optional addition of spinel. The total weight percent of $P_2O_5$ contributed by all raw materials is less than about 0.1%. In this combination the raw materials have one of the following three sets of properties.

In the first set, the talc has a mean particle diameter of less than about 3 micrometers. There is 0% to about 49% by weight of kaolin having a mean particle diameter of less than about 3 micrometers, 0% to about 15% by weight of a first $Al_2O_3$-forming component having a specific surface area greater than about 5 m2/g and less than about 25 m2/g or a mean particle diameter of less than about 1 micrometer and greater than about 0.2 micrometer, and 0% to about 39% by weight of a second $Al_2O_3$-forming component having a specific surface area greater than about 25 m2/g or a mean particle diameter of less than about 0.2 micrometer. The weight percent of the calcined kaolin does not exceed {6+26×(weight percent of the second $Al_2O_3$-forming component)/[(weight percent of the first $Al_2O_3$-forming component)+(weight percent of the second $Al_2O_3$-forming component)]}, and the weight percent of the non-colloidal silica not exceeding {3.75+16.25×(weight percent of the second $Al_2O_3$-forming component)/[(weight percent of the first $Al_2O_3$-forming component)+(weight percent of the second $Al_2O_3$-forming component)]}-0.625×(weight percent calcined kaolin).

In the second set, the talc has a mean particle diameter of less than about 3 micrometers, the kaolin has a mean particle diameter of greater than about 3 micrometers, the $Al_2O_3$-forming component has a specific surface area of greater than about 25 m2/g or a mean particle diameter of less than about 0.2 micrometers, the weight percent of calcined kaolin does not exceed about 32%, and the weight percent of non-colloidal silica does not exceed about [20-0.625×(wt. % calcined kaolin)].

In the third set the talc has a mean particle diameter greater than about 3 micrometers, the kaolin has a mean particle diameter of less than about 3 micrometers, at least one of the $Al_2O_3$-forming components has a specific surface area of greater than about 25 m2/g or a mean particle diameter of less than about 0.2 micrometers, and the sum of the weight percents of calcined kaolin, non-colloidal silica, and $Al_2O_3$-forming component having a specific surface area between about 5 and 25 m2/g or a mean particle diameter between about 1 and 0.2 micrometers does not exceed about 6 wt. %.

The raw materials are intimately blended with an effective amount of vehicle and forming aids and plastically shaped into a green body that is dried and fired at a temperature of about 1370° C. to 1435° C. Firing schedules vary according to the raw materials. When the raw materials are of the first combination, the heating rate from about 1150° C. to 1275° C. is less than about 1000° C./hr when the mean particle diameter of the talc is larger than about 4 micrometers and the mean particle diameter of the kaolin is greater than about 0.6 micrometers, and greater than about 200° C./hr when the mean particle diameter of the talc is less than about 2 micrometers. When the raw materials are of the second combination, the heating rate from about 1150° C. to 1275° C. is at least about 300° C./hr when the mean particle diameter of the talc is greater than about 4 micrometers, and the mean particle diameter of the MgO-forming material is less than about 2 micrometers, greater than about 625° C./hr when the mean particle diameter of the talc is greater than about 4 micrometers and the mean particle diameter of the MgO-forming material is greater than about 3 micrometers, and greater than about 400° C./hr when the mean particle diameter of the talc is less than about 2 micrometers. When the raw materials are of the first set of the third combination, the heating rate from 1150° C. to 1275° C. is at least about 500° C./hr when the mean particle diameter of the kaolin is greater than about 0.5 micrometers. When the raw materials are of the second set of the third combination, the heating rate from 1150° C. to 1275° C. is at least about 100° C./hr.

DETAILED DESCRIPTION OF THE INVENTION

This invention relates to bodies of low thermal expansion or CTE measured at 25–800° C., and low porosity resulting in low gas permeability. For example when the CTE is <4×10-7C-1, the total porosity is <20%, when the CTE is >4×10-7C-1 but <9×10-7C-1, the porosity is <12%, and when the CTE is >9×10-7C-1 but <15×10-7C-1, the porosity is <10%. Optionally, the bodies have a fine mean pore size, such as for example, less than about 1.0 micrometer in diameter. The bodies are made by a process that involves selection of specific combinations of raw materials and firing conditions. There is no need for fluxing additives to promote densification which could adversely affect CTE, chemical durability, or refractoriness of the body.

Unless otherwise specified particle size is expressed as mean particle diameter. Particle size is measured by a sedimentation technique.

Porosity is total porosity measured by mercury porosimetry.

The raw materials

There are three combinations of raw materials to achieve the cordierite composition of about 49% to 53% SiO2, about 12% to 16% MgO, and about 33% to 38% Al2O3 that are suited to achieve the low expansion and low porosity bodies of the present invention.

The first combination is talc, spinel (MgAl2O4), and kaolin. Optionally, calcined kaolin and silica can be present. The mean particle size of the kaolin is less than about 4 micrometers. When calcined kaolin and/or non-colloidal silica are present, their combined weight percent is less than about 10% in order to maintain low porosity. The total P2O5 content contributed by all the raw materials is less than about 0.1 wt. %.

The second combination is talc, kaolin, and MgO-forming material. Optionally, an Al2O3-forming component, spinel, and silica can be present. When non-colloidal silica is present, it is less than about 10% by weight. When an Al2O3-forming component is present, its amount must be less than about 10 wt. % when the dispersed mean particle diameter is greater than about 2 micrometers. The total P2O5 content contributed by all the raw materials is less than about 0.1 wt. %. Calcined kaolin is not used because this increases the CTE. By MgO-forming component is meant MgO itself, or other material having low water solubility which when fired converts to MgO, such as Mg(OH)2, MgCO3, or combinations of these, etc.

The third combination is talc, an Al2O3-forming component, and one or more of the components of kaolin, calcined kaolin, and silica. By Al2O3-forming component is meant Al2O3 itself or other material having low water solubility which when fired converts to Al2O3. Some typical Al2O3-forming components are those that readily disperse into fine particles such as e.g. alpha-alumina, Al(OH)3, boehmite, and/or pseudo-boehmite aluminum oxide hydroxide. Optionally, spinel can be present. The total P2O5 content contributed by all the raw materials is less than about 0.1 wt. %.

For the third combination, there can be several sets of properties of the respective raw materials.

One set of properties is where the talc has a particle size less than about 3 micrometers in diameter, in combination with 0% to about 49% by weight of kaolin having a mean particle diameter of less than about 3 micrometers, 0% to about 15% by weight of a first Al2O3-forming component having a specific surface area greater than about 5 m2/g and less than about 25 m2/g or a mean particle diameter of less than about 1 micrometer and greater than about 0.2 micrometer, and 0% to about 39% by weight of a second Al2O3-forming component having a specific surface area greater than about 25 m2/g or a mean particle diameter of less than about 0.2 micrometer, with the weight percent of the calcined kaolin not exceeding {6+26×(weight percent of the second Al2O3-forming component)/[(weight percent of the first Al2O3-forming component)+(weight percent of the second Al2O3-forming component)]}, and the weight percent of the non-colloidal silica not exceeding {3.75+16.25×(weight percent of the second Al2O3-forming component)/[(weight percent of the first Al2O3-forming component)+(weight percent of the second Al2O3-forming component)]} −0.625×(weight percent calcined kaolin).

A second set of properties is where the talc has a mean particle size less than about 3 micrometers, the kaolin has a mean particle size greater than about 3 micrometers. The Al2O3-forming component has a specific surface area of greater than about 25 m2/g or a dispersed mean particle diameter of less than about 0.2 micrometers. The weight percent of calcined kaolin does not exceed about 32%, and the weight percent of non-colloidal silica does not exceed about [20−0.625×(wt. % of calcined kaolin)].

A third set of properties is where the talc has a mean particle size of greater than about 3 micrometers in diameter, and the kaolin has a mean particle size of less than about 3 micrometers in diameter. At least one of the Al2O3-forming components has a specific surface area of greater than about 25 m2/g or a dispersed mean particle diameter of less than about 0.2 micrometers. The sum of the weight percents of calcined kaolin, non-colloidal silica, and the Al2O3-forming component having a specific surface area between about 5 and 25 m2/g or a mean particle diameter between about 1 and 0.2 micrometers does not exceed about 6%.

One useful raw materials mixture of the third combination is where the talc has a mean particle diameter of less than about 3 micrometers, the kaolin has a mean particle diameter of less than about 2 micrometers, the amount of calcined kaolin is greater than about 15% by weight, and at least about 10% by weight of the Al2O3-forming component is provided in a form that readily disperses into particles of less than about 0.2 micrometers in diameter, such as e.g. boehmite, and/or pseudo-boehmite aluminum oxide hydroxide.

Another useful raw materials mixture of the third combination is where the talc has a mean particle diameter of less than about 3 micrometers, the kaolin has a mean particle diameter of greater than about 3 micrometers, and the amount of calcined kaolin is greater than about 15% by weight.

Use of colloidal silica in the raw material mixture further reduces the porosity.

The raw materials are blended with vehicle and forming aids that impart plastic formability and green strength to the raw materials when they are shaped into a body. When the forming is done by extrusion, the extrusion aids are most typically cellulose ether organic binder, and a lubricant such as sodium ammonium or diglycol stearate, although the invention is not limited to these.

The organic binder contributes to the plasticity of the mixture for shaping into a body. The plasticizing organic binder according to the present invention refers to cellulose ether binders. Some typical organic binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred components of cellulose ethers are Methocel A4M, F4M, F240, and K75M from Dow Chemical Co. Methocel A4M is a methylcellulose, while Methocel F4M, F240, and K75M are hydroxypropyl methylcellulose.

The organic binder content is typically is about 3% to 6%, based on the raw material.

The vehicle can be inorganic, i.e. consisting largely of water, which is typically but not exclusively about 28% to 46%; or it can be organic. The use of water is preferred, although evaporable organic liquids such as lower alkanols can be wholly or partly substituted as desired.

The weight percents of the organic binder, vehicle and other additives are calculated as superadditions with respect to the raw materials.

The mixture is then formed into a green body. The preferred forming method is by extrusion through a die. Extrusion can be done by using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The bodies according to the present invention can have any convenient size and shape. However, the process is especially suited to production of cellular monolith bodies such as honeycombs. Cellular bodies find use in a number of applications such as catalyst carriers, filters such as diesel particulate filters, molten metal filters, regenerator cores, etc.

Generally honeycomb cell densities range from 235 cells/cm$^2$ (about 1500 cells/in$^2$) to 15 cells/cm$^2$ (about 100 cells/in$^2$). Wall (web) thicknesses range typically from about 0.07 to about 0.6 mm (about 3 to about 25 mils). The external size and shape of the body is controlled by the application, e.g. in automotive applications by engine size and space available for mounting, etc. This invention is especially advantageous for honeycombs having very thin walls, e.g. <0.13 mm (5 mils). Thinner walled honeycombs can be made e.g. 025–0.1 mm (1–4 mils) for some of the inventive mixtures especially those that contain clay, alumina, and a talc all of which have a mean particle size of <3 micrometers in diameter.

The green body is then dried according to conventional procedures for green cordierite bodies such as e.g. oven or dielectric drying.

The dried body is then fired at a temperature of about 1370° C. to 1435° C. Depending on the raw material combination, the firing conditions will vary.

For example, with the first combination, it is necessary that the heating rate from about 1150° C. to 1275° C. is less than about 1000° C./hr when the mean particle diameter of the talc is larger than about 4 micrometers and the mean particle diameter of the kaolin is greater than about 0.6 micrometers, and greater than about 200° C./hr when the mean particle diameter of the talc is less than about 2 micrometers. It is preferred that when the talc has a mean particle diameter of greater than about 3 micrometers, and the kaolin has a mean particle diameter of less than about 2 micrometers, and the heating rate between 1150° C. and 1275° C. is less than about 100° C./hr.

For the second combination, the heating rate between 1150° C. and 1275° C. must be at least about 300° C./hr when the mean particle diameter of the talc is greater than about 4 micrometers, and the mean particle diameter of the MgO-forming material is less than about 2 micrometers, and greater than about 625° C./hr when the mean particle diameter of the talc is greater than about 4 micrometers and the mean particle diameter of the MgO-forming material is greater than about 3 micrometers, and greater than about 400° C./hr when the mean particle diameter of the talc is less than about 2 micrometers.

When the raw materials are of the first set of the third combination, the heating rate from 1150° C. to 1275° C. is at least about 500° C./hr when the mean particle diameter of the kaolin is greater than about 0.5 micrometers.

When the raw materials are of the second set of the third combination, the heating rate from 1150° C. to 1275° C. is at least about 100° C./hr.

The fired body is then cooled to room temperature in as short a time as is practical.

The low CTE-low porosity bodies of the present invention are especially useful as rotary heat exchangers (regenerators) for gas turbine and other heat engines, where leakage of hot gas must be minimized. Such bodies, especially those having small mean pore size, exhibit improved strength which would be advantageous in automotive catalytic applications, especially where used as substrates such as high cell density thin walled honeycomb structures.

To more fully illustrate the invention, the following non-limiting examples are presented. All parts, portions, and percentages are on a weight basis unless otherwise stated.

The following examples illustrate inventive and comparative bodies and methods. Weight percentages of raw materials are provided in Table 1. Firing schedules and physical properties for the examples are listed in Table 2. All examples were extruded as 2.54 cm (1") honeycombs having cell densities of about 62 cells/cm2 (400 cells/in2) and wall thicknesses of about 0.2 mm (0.008"). Extruded ware was wrapped in aluminum foil and dried at about 85° C. for about 48 hours prior to firing. Mixtures containing talc+kaolin+spinel.

The formation of cordierite from mixtures containing talc+spinel+kaolin has not previously been described in the prior art. The examples below show that this combination of raw materials yields inventive bodies when the mean particle size of the kaolin is less than about 4 micrometers.

Examples 1–6 demonstrate that mixtures of 6.1 micrometer talc+1.0 micrometer spinel+0.4 micrometer kaolin yield inventive bodies with low CTE and low porosity when fired over a wide range of heating rates between about 1150° C. and 1275° C.

Examples 7–9 show that mixtures of about 6.1 micrometer talc+1.0 micrometer spinel+0.9 micrometer kaolin also result in inventive bodies for a wide range of firing schedules. However, comparative example 10 illustrates that the heating rate between about 1150° C. and 1275° C. must be less than about 1000° C./hr in order to obtain a low porosity.

Comparative examples 11 and 12 show that a mixture of coarser kaolin (7.4 micrometers) with 6.1 micrometer talc and 1.0 micrometer spinel yield bodies of CTE and porosity outside the range of the present invention.

Inventive example 13 shows that the mean particle size of the talc can be reduced to at least as fine as about 1.6 micrometers and still yield an inventive body when mixed with spinel and fine kaolin and fired with a heating rate between 1150° C. and 1275° C. of about 1200° C./hr. Comparative example 14 illustrates that the use of such fine talc yields a body with an excessively high CTE when fired at a much slower heating rate of about 40° C./hr between 1150° C. and 1275° C.

Comparative examples 15–17 demonstrate that substitution of about 38.6% calcined kaolin for some of the 0.9 micrometer raw kaolin increases the porosity to high levels that lie outside the range of the present invention when the talc is as fine as about 1.6 micrometers.

Comparative examples 18 and 19 show that the mean particle size of the kaolin cannot be increased to about 7.4 micrometers when the mean particle size of the talc is as fine as about 1.6 micrometers in talc+kaolin+spinel mixtures, because such combinations result in excessively high CTE and porosity in fired bodies, regardless of heating rates employed.

Mixtures containing talc+kaolin+MgO-forming component

Examples 20–22 show that mixtures of about 6.1 micrometer talc+0.9 micrometer kaolin+0.8 micrometer MgO yield inventive bodies with low CTE and low porosity when the heating rate between 1150° C. and 1275° C. is about 625° C. to 1200° C./hr. Comparative examples 23 and 24 demonstrate that this mixture results in non-inventive high porosities when the heating rate is 50° C./hr to 200° C./hr for this combination of raw materials.

Examples 25 and 26 illustrate that a mixture of 6.1 micrometer talc+0.9 micrometer kaolin+6.5 micrometer Mg(OH)2 produces inventive bodies for very fast 1150–1275° C. heating rates. However, comparative examples 27–30 show that porosities and/or CTEs are too high unless the 1150–1275° C. heating rate is greater than about 625° C./hr.

Examples 31–33 reveal that a mixture of coarser 7.4 micrometer kaolin with the 6.1 micrometer talc and 6.5 micrometer Mg(OH)2 also yields ceramics with inventive low CTE and porosity when heating rates are high. Comparative examples 34–36 show that the heating rate below 1275° C. must be greater than 625° C./hr to maintain both low CTE and low porosity.

Examples 37–40 show that inventive bodies with low CTE and low porosity can be made from mixtures of fine 1.6 micrometer talc+0.8 micrometer MgO with either fine (0.9 micrometer) or coarse (7.4 micrometer) kaolin, provided that the heating rate from 1150–1275° C. is greater than about 400° C./hr.

Mixtures containing fine talc+fine kaolin+Al2O3-forming material

Examples 41–44 illustrate that inventive bodies can be made by firing a mixture of 2.1 micrometer talc+0.3 micrometer kaolin+0.4 micrometer alumina having a BET surface area of about 8.5 m2/g and a mean particle size of 0.4 micrometers over a very wide range of heating rates.

Examples 45 and 46 show that inventive bodies can also be made using a slightly coarser 0.9 micrometer kaolin in combination with fine talc and fine alumina. However, comparative example 47 shows that the heating rate between about 1150° C. and 1275° C. must be greater than about 500° C./hr in order to maintain a low CTE.

Comparative examples 48–57 demonstrate that partial replacement of raw kaolin having a mean particle size of 0.9 micrometers with about 32.6% calcined kaolin, in combination with 1.6 micrometer talc and 0.4 micrometer alumina, yields bodies with porosities >20%. Thus, when all of the Al2O3-forming material is provided as a material having a mean particle diameter of greater than about 0.2 micrometers, the amount of calcined kaolin must be less than about 6% to maintain a porosity of <20%.

Examples 58–60 show that porosities exceed 30% when 23.5% crystalline silica powder is used in combination with 1.6 micrometer talc and 0.4 micrometer alumina. Thus, when all of the Al2O3-forming component is provided as a material having a mean particle diameter of greater than about 0.2 micrometers, the amount of silica powder must also be less than about 3.75% to maintain a porosity of <20%.

Comparative examples 61–65 further illustrate that porosity is increased to very high levels when the mean particle size of the Al2O3-forming material is increased to 4.5 micrometers in combination with 1.6 micrometer talc+0.9 micrometer kaolin+32.6% calcined kaolin.

Examples 66–68 demonstrate that low porosity bodies with especially low thermal expansion can be achieved when fired over a wide range of heating rates from combinations of 1.6 micrometer talc+0.9 micrometer kaolin+29% calcined kaolin+AlOOH.xH2O powder having a surface area of about 180 m2/g and an average dispersed particle size of about 125 nm (0.125 micrometers). The extremely fine Al2O3-forming material offsets the tendency of the calcined kaolin to increase the amount of total porosity. Thus, when the mean particle size of the fine Al2O3-forming material is finer than about 0.2 micrometers, the amount of calcined kaolin can be as high as about 32%.

Example 69 shows that inventive bodies are also produced by firing combinations of 1.6 micrometer talc+0.9 micrometer kaolin+calcined kaolin+dispersible high surface area AlOOH.xH2O+an aqueous suspension of colloidal silica.

Example 70 illustrates that porosity <20% and extremely low CTE are also obtained from mixtures of 1.6 micrometer talc+0.9 micrometer kaolin+calcined kaolin+dispersible high surface area AlOOH.xH20 powder+an aqueous suspension of colloidal silica+16.6% crystalline silica. However, comparative example 71 shows that porosities exceed about 20% when the amount of crystalline silica is increased to more than about 20%.

Mixtures containing fine talc+coarse kaolin+Al2O3-forming material

Example 72 demonstrates that a coarser kaolin having a mean particle size of about 7.4 micrometers used in combination with fine 1.6 micrometer talc+29% calcined kaolin+dispersible high surface area AlOOH.xH2O powder yields an inventive body when fired at a heating rate of at least about 100° C./hr from 1150–1275° C. However, comparative example 73 shows that this raw material combination yields a body having a porosity and CTE outside the present invention when the heating rate is less than about 100° C./hr from 1150–1275° C.

Comparative examples 74–77 show that excessively high porosities result when the mean particle size of the Al2O3-forming material is greater than about 0.2 micrometers when the mean particle size of the kaolin is greater than about 4 micrometers in combination with 1.6 micrometer talc, even in the absence of calcined kaolin.

Mixtures containing coarse talc+fine kaolin+Al2O3-forming material

Examples 78–80 show that the particle size of the talc can be increased to at least about 6.1 micrometers in the presence of fine 0.9 micrometer kaolin, provided that at least about half by weight of the Al2O3-forming material has a surface area of >25 m2/g and a dispersed particle size <0.2 micrometers such as supplied by a pseudo-boehmite, AlOOH.xH2O.

Comparative examples 81 and 82 show that the use of coarse 6.1 micrometer talc+0.9 micrometer kaolin+0.4 micrometer alumina with a surface area of about 8.5 m2/g yields porosities that are higher than the inventive region, thus illustrating that at least about half by weight of the Al2O3-forming component must be supplied as a very high surface area material with a dispersed particle size <0.2 micrometers when the talc is coarser than about 3 micrometers.

TABLE 1

Weight percentages and mean particle sizes (in parentheses) of raw materials used in examples

| Composition Number | Talc | MgO | Mg(OH)$_2$ | MgAl$_2$O$_4$ | Kaolin | Calcined kaolin | 4.5 micrometer Alumina (0.8 m$^2$/g) | 0.4 micrometer Alumina (8.5 m$^2$/g) | 0.125 micrometer AlOOH-xH2O (180 m$^2$/g) | Crystalline Silica | Colloidal Silica |
|---|---|---|---|---|---|---|---|---|---|---|---|
| 1  | 29.3 (6.1) |          |           | 11.0 (1.0) | 59.8 (0.4) |            |      |      |      |      |     |
| 2  | 29.3 (6.1) |          |           | 11.0 (1.0) | 59.8 (0.9) |            |      |      |      |      |     |
| 3  | 29.3 (6.1) |          |           | 11.0 (1.0) | 59.8 (7.4) |            |      |      |      |      |     |
| 4  | 29.3 (1.6) |          |           | 11.0 (1.0) | 59.8 (0.9) |            |      |      |      |      |     |
| 5  | 31.1 (1.6) |          |           | 11.7 (1.0) | 18.6 (0.9) | 38.6 (1.6) |      |      |      |      |     |
| 6  | 29.3 (1.6) |          |           | 11.0 (1.0) | 59.8 (7.4) |            |      |      |      |      |     |
| 7  | 14.3 (6.1) | 7.6 (0.8) |          |            | 78.1 (0.9) |            |      |      |      |      |     |
| 8  | 13.9 (6.1) |          | 10.7 (6.5) |           | 75.5 (0.9) |            |      |      |      |      |     |
| 9  | 13.9 (6.1) |          | 10.7 (6.5) |           | 75.5 (7.4) |            |      |      |      |      |     |
| 10 | 14.3 (1.6) | 7.6 (0.8) |          |            | 78.1 (0.9) |            |      |      |      |      |     |
| 11 | 14.3 (1.6) | 7.6 (0.8) |          |            | 78.1 (7.4) |            |      |      |      |      |     |
| 12 | 39.6 (2.1) |          |           |            | 47.1 (0.3) |            |      | 13.3 |      |      |     |
| 13 | 39.6 (2.1) |          |           |            | 47.1 (0.9) |            |      | 13.3 |      |      |     |
| 14 | 40.9 (1.6) |          |           |            | 12.8 (0.9) | 32.6 (1.6) |      | 13.3 |      |      |     |
| 15 | 42.4 (1.6) |          |           |            |            |            |      | 34.2 |      | 23.5 |     |
| 16 | 40.9 (1.6) |          |           |            | 12.8 (0.9) | 32.6 (1.6) | 13.3 |      |      |      |     |
| 17 | 40.0 (1.6) |          |           |            | 14.0 (0.9) | 29.0 (1.6) |      |      | 17.1 |      |     |
| 18 | 40.1 (1.6) |          |           |            | 9.1 (0.9)  | 15.7 (1.6) |      |      | 25.5 |      | 9.6 |
| 19 | 39.9 (1.6) |          |           |            |            |            |      |      | 37.9 | 16.6 | 5.6 |
| 20 | 39.9 (1.6) |          |           |            |            |            |      |      | 37.9 | 22.2 |     |
| 21 | 40.0 (1.6) |          |           |            | 14.0 (7.4) | 29.0 (1.6) |      |      | 17.1 |      |     |
| 22 | 39.6 (1.6) |          |           |            | 47.1 (7.4) |            |      | 13.3 |      |      |     |
| 23 | 38.2 (6.1) |          |           |            | 45.5 (0.9) |            |      |      | 16.3 |      |     |
| 24 | 39.6 (6.1) |          |           |            | 47.1 (0.9) |            |      | 13.3 |      |      |     |

TABLE 2

Firing schedules and properties of examples.

| Example Number | Composition Number | Example Type | 1150–1275° C. Heating rate (° C./hour) | Soak Time at 1275° C. (hours) | 1275–1400° C. Heating rate (° C./hour) | Soak Temp. (° C.) | Soak Time (hours) | CTE | % Porosity | Intrusion volume (cm³/g) | Mean pore diameter (μm) | Weight % P₂O₅ |
|---|---|---|---|---|---|---|---|---|---|---|---|---|
| 1 | 1 | Inventive | 50 | 0 | 50 | 1410 | 8 | 4.6 | 11.0 | 0.0500 | 0.3 | |
| 2 | 1 | Inventive | 200 | 0 | 200 | 1410 | 5 | 3.0 | 16.1 | 0.0777 | 0.6 | |
| 3 | 1 | Inventive | 625 | 0 | 625 | 1410 | 5 | 2.0 | 9.4 | 0.0410 | 0.4 | |
| 4 | 1 | Inventive | 1200 | 0 | 200 | 1410 | 1.7 | 1.5 | 7.5 | 0.0322 | 0.3 | |
| 5 | 1 | Inventive | 1200 | 0 | 500 | 1410 | 1.0 | 6.1 | 7.0 | 0.0292 | 0.2 | |
| 6 | 1 | Inventive | 1200 | 0 | 500 | 1410 | 0.5 | 9.6 | 7.4 | 0.0313 | 0.2 | |
| 7 | 2 | Inventive | 50 | 0 | 50 | 1410 | 8 | 3.2 | 10.3 | 0.0470 | 0.4 | 0.068 |
| 8 | 2 | Inventive | 200 | 0 | 200 | 1410 | 5 | 1.8 | 8.4 | 0.0404 | | |
| 9 | 2 | Inventive | 625 | 0 | 625 | 1410 | 5 | 0.5 | 12.3 | 0.0557 | 0.7 | |
| 10 | 2 | Comparative | 1200 | 0 | 200 | 1410 | 1.7 | 4.2 | 27.7 | 0.0819 | 11.3 | |
| 11 | 3 | Comparative | 625 | 0 | 625 | 1410 | 5 | 4.3 | 25.3 | 0.1370 | 10.2 | |
| 12 | 3 | Comparative | 1200 | 0 | 200 | 1410 | 1.7 | 5.2 | 13.2 | 0.0269 | 0.4 | |
| 13 | 4 | Inventive | 1200 | 0 | 200 | 1410 | 1.7 | 6.1 | 6.3 | 0.0272 | * | |
| 14 | 4 | Comparative | 40 | 0 | 25 | 1405 | 8 | 11.8 | 15.0 | 0.0728 | 0.8 | |
| 15 | 5 | Comparative | 175 | 0 | 200 | 1410 | 1.7 | 9.2 | 31.8 | 0.1871 | 1.8 | |
| 16 | 5 | Comparative | 40 | 0 | 25 | 1405 | 8 | 8.8 | 32.7 | 0.2013 | 1.5 | |
| 17 | 5 | Comparative | 1200 | 0 | 200 | 1410 | 1.7 | 6.1 | 21.2 | 0.1095 | 1.7 | |
| 18 | 6 | Comparative | 1200 | 0 | 200 | 1410 | 1.7 | 9.6 | 23.1 | 0.1203 | 2.5 | |
| 19 | 6 | Comparative | 40 | 0 | 25 | 1405 | 8 | 10.7 | 34.2 | 0.2108 | 1.8 | |
| 20 | 7 | Inventive | 625 | 0 | 625 | 1410 | 5 | 3.2 | 18.0 | 0.0881 | 5.4 | |
| 21 | 7 | Inventive | 1200 | 0 | 200 | 1410 | 1.7 | 2.6 | 14.5 | 0.0688 | 0.6 | 0.045 |
| 22 | 7 | Inventive | 1200 | 0 | 500 | 1410 | 1.0 | 3.4 | 16.6 | 0.0779 | 0.7 | |
| 23 | 7 | Comparative | 50 | 0 | 50 | 1410 | 8 | 10.4 | 24.9 | 0.1335 | 1.5 | |
| 24 | 7 | Comparative | 200 | 0 | 200 | 1410 | 5 | 5.0 | 23.7 | 0.1252 | 2.8 | |
| 25 | 8 | Inventive | 1200 | 0 | 500 | 1410 | 1.0 | 2.9 | 8.8 | 0.0388 | 0.3 | |
| 26 | 8 | Inventive | 1200 | 0 | 500 | 1410 | 0.5 | 3.6 | 10.4 | 0.0465 | 0.3 | |
| 27 | 8 | Comparative | 25 | 0 | 25 | 1410 | 8 | 16.1 | 20.4 | 0.1115 | 2.3 | |
| 28 | 8 | Comparative | 50 | 0 | 50 | 1410 | 8 | 14.4 | 20.5 | 0.1086 | 1.7 | |
| 29 | 8 | Comparative | 200 | 0 | 200 | 1410 | 5 | 13.7 | 20.6 | 0.1108 | 0.09 | |
| 30 | 8 | Comparative | 625 | 0 | 625 | 1410 | 5 | 4.8 | 17.4 | 0.0865 | 3.1 | |
| 31 | 9 | Inventive | 1200 | 0 | 200 | 1410 | 1.7 | 3.2 | 13.2 | 0.0616 | 2.2 | 0.019 |
| 32 | 9 | Inventive | 1200 | 0 | 500 | 1410 | 1.0 | 5.2 | 6.7 | 0.0287 | 0.4 | |
| 33 | 9 | Inventive | 1200 | 0 | 500 | 1410 | 0.5 | 7.4 | 8.6 | 0.0376 | 0.5 | |
| 34 | 9 | Comparative | 50 | 0 | 50 | 1410 | 8 | 9.0 | 32.0 | 0.1887 | 3.5 | |
| 35 | 9 | Comparative | 200 | 0 | 200 | 1410 | 5 | 8.5 | 27.0 | 0.1542 | 5.4 | |
| 36 | 9 | Comparative | 625 | 0 | 625 | 1410 | 5 | 3.9 | 22.6 | 0.1173 | 8.7 | |
| 37 | 10 | Inventive | 1200 | 0 | 200 | 1410 | 1.7 | 3.1 | 7.0 | 0.0301 | * | |
| 38 | 10 | Comparative | 40 | 0 | 25 | 1405 | 8 | 7.7 | 18.4 | 0.0925 | 0.6 | |
| 39 | 11 | Inventive | 1200 | 0 | 200 | 1410 | 1.7 | 1.7 | 8.8 | 0.0391 | * | |
| 40 | 11 | Comparative | 40 | 0 | 25 | 1405 | 8 | 9.3 | 31.8 | 0.1921 | 1.8 | |
| 41 | 12 | Inventive | 50 | 0 | 50 | 1410 | 8 | 9.8 | 9.8 | 0.0451 | 0.2 | 0.059 |
| 42 | 12 | Inventive | 625 | 0.25 | 1620 | 1414 | 2.5 | 6.2 | 10.4 | 0.0472 | 0.3 | |
| 43 | 12 | Inventive | 625 | 0.25 | 1620 | 1414 | 5 | 4.4 | 10.5 | 0.0476 | 0.3 | |
| 44 | 12 | Inventive | 1200 | 0 | 200 | 1410 | 1.7 | 5.9 | 8.0 | 0.0345 | 0.2 | |
| 45 | 13 | Inventive | 625 | 0.25 | 1620 | 1414 | 2.5 | 8.0 | 11.8 | 0.0552 | 0.2 | |
| 46 | 13 | Inventive | 1200 | 0 | 200 | 1410 | 1.7 | 6.7 | 8.9 | 0.0395 | 0.2 | |
| 47 | 13 | Comparative | 50 | 0 | 50 | 1410 | 8 | 11.3 | 12.6 | 0.0598 | 0.9 | |
| 48 | 14 | Comparative | 25 | 0 | 25 | 1410 | 8 | 8.0 | 32.0 | 0.1932 | 1.7 | |
| 49 | 14 | Comparative | 50 | 0 | 50 | 1410 | 8 | 6.3 | 32.7 | 0.1976 | 1.9 | |
| 50 | 14 | Comparative | 625 | 0 | 625 | 1414 | 5 | 3.6 | 29.6 | 0.1693 | 2.8 | |
| 51 | 14 | Comparative | 625 | 0.25 | 1620 | 1414 | 5 | 5.4 | 29.4 | 0.1670 | 2.8 | |
| 52 | 14 | Comparative | 1200 | 0 | 50 | 1410 | 2.5 | 2.8 | 26.1 | 0.1447 | 2.7 | |
| 53 | 14 | Comparative | 1200 | 0 | 125 | 1410 | 0.5 | 7.6 | 27.9 | 0.1555 | 2.1 | |
| 54 | 14 | Comparative | 1200 | 0.3 | 150 | 1410 | 1 | 5.2 | 28.0 | 0.1566 | 1.8 | |
| 55 | 14 | Comparative | 1200 | 0 | 200 | 1410 | 1.7 | 3.9 | 22.8 | 0.1692 | 1.7 | |
| 56 | 14 | Comparative | 1200 | 0 | 500 | 1410 | 1.0 | 6.1 | 26.5 | 0.1431 | 2.9 | |
| 57 | 14 | Comparative | 1500 | 0 | 1500 | 1410 | 5 | 3.6 | 23.7 | 0.1294 | 3.5 | |
| 58 | 15 | Comparative | 25 | 0 | 25 | 1410 | 8 | 3.3 | 34.8 | 0.2161 | 1.5 | |
| 59 | 15 | Comparative | 50 | 0 | 50 | 1410 | 8 | 2.8 | 35.3 | 0.2205 | 1.5 | |
| 60 | 15 | Comparative | 200 | 0 | 200 | 1410 | 12 | 1.9 | 31.2 | 0.1924 | 2.5 | |
| 61 | 16 | Comparative | 25 | 0 | 25 | 1410 | 8 | 10.3 | 38.0 | 0.2481 | 2.3 | |
| 62 | 16 | Comparative | 50 | 0 | 50 | 1410 | 8 | 8.6 | 36.4 | 0.2327 | 2.4 | |
| 63 | 16 | Comparative | 625 | 0 | 200 | 1410 | 12 | 8.2 | 33.8 | 0.2081 | 4.3 | |
| 64 | 16 | Comparative | 625 | 0 | 625 | 1410 | 5 | 11.9 | 34.4 | 0.2179 | 4.3 | |
| 65 | 16 | Comparative | 1200 | 0 | 200 | 1410 | 1.7 | 10.0 | 30.8 | 0.1743 | 4.8 | |
| 66 | 17 | Inventive | 40 | 0 | 25 | 1405 | 8 | 3.8 | 20.0 | 0.0989 | 0.9 | |
| 67 | 17 | Inventive | 175 | 0 | 200 | 1410 | 1.7 | 1.3 | 15.4 | 0.0748 | 1.2 | |
| 68 | 17 | Inventive | 1200 | 0 | 200 | 1410 | 1.7 | 1.1 | 5.1 | 0.0220 | * | |
| 69 | 18 | Inventive | 40 | 0 | 25 | 1405 | 8 | 1.9 | 14.0 | | 2.5 | |
| 70 | 19 | Inventive | 40 | 0 | 25 | 1405 | 8 | -0.5 | 19.8 | | 2.7 | |
| 71 | 20 | Comparative | 40 | 0 | 25 | 1405 | 8 | -0.2 | 21.0 | | 2.7 | |

TABLE 2-continued

Firing schedules and properties of examples.

| Example Number | Composition Number | Example Type | 1150–1275° C. Heating rate (° C./hour) | Soak Time at 1275° C. (hours) | 1275–1400° C. Heating rate (° C./hour) | Soak Temp. (° C.) | Soak Time (hours) | CTE | % Porosity | Intrusion volume (cm³/g) | Mean pore diameter (μm) | Weight % $P_2O_5$ |
|---|---|---|---|---|---|---|---|---|---|---|---|---|
| 72 | 21 | Inventive | 175 | 0 | 200 | 1410 | 1.7 | 3.2 | 15.2 | 0.0740 | 1.2 | |
| 73 | 21 | Comparative | 40 | 0 | 25 | 1405 | 8 | 5.3 | 20.8 | 0.1075 | 1.1 | |
| 74 | 22 | Comparative | 25 | 0 | 25 | 1410 | 8 | 7.1 | 31.4 | 0.1849 | 1.8 | |
| 75 | 22 | Comparative | 50 | 0 | 50 | 1410 | 8 | 5.8 | 30.6 | 0.1794 | 1.8 | |
| 76 | 22 | Comparative | 625 | 0 | 625 | 1410 | 5 | 3.6 | 23.1 | 0.1245 | 4.6 | |
| 77 | 22 | Comparative | 1200 | 0 | 200 | 1410 | 1.7 | 3.1 | 26.8 | 0.1425 | 4.0 | |
| 78 | 23 | Inventive | 50 | 0 | 50 | 1410 | 8 | 2.9 | 18.1 | 0.0894 | 1.9 | 0.048 |
| 79 | 23 | Inventive | 200 | 0 | 200 | 1410 | 5 | 0.7 | 17.3 | 0.0849 | 8.2 | |
| 80 | 23 | Inventive | 625 | 0 | 625 | 1410 | 5 | 1.2 | 15.0 | 0.0703 | 3.1 | |
| 81 | 24 | Comparative | 26 | 0 | 14.5 | 1425 | 10 | 2.7 | 24.5 | 0.1300 | 5.0 | |
| 82 | 24 | Comparative | 625 | 0 | 625 | 1410 | 5 | 5.0 | 22.2 | 0.1132 | 15.5 | |

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of producing a cordierite body, the method comprising:
    a) selecting cordierite-forming raw materials in combinations selected from the group consisting of
        i) a first combination, comprising talc, spinel, and kaolin, with optional additions of calcined kaolin and silica, with the mean particle diameter of the kaolin being less than about 4 micrometers, the sum of amount of calcined kaolin and non-colloidal silica being less than about 10 wt. %, and the total weight percent of P2O5 contributed by all raw materials being less than about 0.1%,
        ii) a second combination comprising talc, kaolin, and MgO-forming material, with optional additions of an Al2O3-forming component, spinel, and silica, the amount of non-colloidal silica being less than about 10 wt. %, the amount of Al2O3-forming component being less than about 10% when the mean particle diameter of the Al2O3-forming component is greater than about 2 micrometers, and the total weight percent of P2O5 contributed by all raw materials being less than about 0.1%, and
        iii) a third combination, comprising talc, Al2O3-forming component, and one or more of the components of kaolin, calcined kaolin, and silica, with optional addition of spinel, wherein the total weight percent of P2O5 contributed by all raw materials is less than about 0.1%, and wherein there are sets of properties of said raw materials selected from the group consisting of
    a first set wherein the talc has a mean particle diameter of less than about 3 micrometers, in combination with 0% to about 49% by weight of kaolin having a mean particle diameter of less than about 3 micrometers, 0% to about 15% by weight of a first Al2O3-forming component having a specific surface area greater than about 5 m2/g and less than about 25 m2/g or a mean particle diameter of less than about 1 micrometer and greater than about 0.2 micrometer, and 0% to about 39% by weight of a second Al2O3-forming component having a specific surface area greater than about 25 m2/g or a mean particle diameter of less than about 0.2 micrometer, with the weight percent of the calcined kaolin not exceeding {6+26×(weight percent of the second Al2O3-forming component)/[(weight percent of the first Al2O3-forming component)+(weight percent of the second Al2O3-forming component)]}, and the weight percent of the non-colloidal silica not exceeding {3.75+16.25×(weight percent of the second Al2O3-forming component)/[(weight percent of the first Al2O3-forming component)+(weight percent of the second Al2O3-forming component)]}−0.625×(weight percent calcined kaolin),
    a second set, wherein the talc has a mean particle diameter of less than about 3 micrometers, the kaolin has a mean particle diameter of greater than about 3 micrometers, the Al2O3-forming component has a specific surface area of greater than about 25 m2/g or a mean particle diameter of less than about 0.2 micrometers, and the weight percent of calcined kaolin does not exceed about 32%, and the weight percent of non-colloidal silica does not exceed about [20−0.625×(wt. % calcined kaolin)], and
    a third set wherein the talc has a mean particle diameter greater than about 3 micrometers, the kaolin has a mean particle diameter of less than about 3 micrometers, at least one of the Al2O3-forming components has a specific surface area of greater than about 25 m2/g or a mean particle diameter of less than about 0.2 micrometers, and the sum of the weight percents of calcined kaolin, non-colloidal silica, and Al2O3-forming component having a specific surface area between about 5 and 25 m2/g or a mean particle diameter between about 1 and 0.2 micrometers does not exceed about 6 wt. %;
    b) intimately blending the raw materials with an effective amount of vehicle and forming aids to impart plastic formability and green strength to the raw materials and form a plastic mixture therefrom;
    c) forming said raw materials into a green body;
    d) drying the green body; and
    e) firing said green body at temperature of about 1370° C. to 1435° C.,
    wherein when the raw materials are of the first combination, the heating rate from about 1150° C. to 1275° C. is less than about 1000° C./hr when the mean particle diameter of the talc is larger than about 4 micrometers and the mean particle diameter of the kaolin is greater than about 0.6 micrometers, and greater than about 200° C./hr when the mean particle diameter of the talc is less than about 2 micrometers, when the raw materials are of the second combination, the heating rate from about 1150° C. to 1275° C. is at least about 300° C./hr when the mean particle diameter of the talc is greater than about 4 micrometers, and the mean particle diameter of the MgO-forming material is less than about 2 micrometers, greater than about 625° C./hr when the mean particle diameter of the talc is greater than about 4 micrometers and the mean particle diameter of the MgO-forming material is greater than about 3 micrometers, and greater than about 400° C./hr when the mean particle diameter of the talc is less than about 2 micrometers, when the raw materials are of the first set of the third combination, the heating rate from 1150° C. to 1275° C. is at least about 500° C./hr when the mean particle diameter of the kaolin is greater than about 0.5 micrometers, when the raw materials are of the second set of the third combination, the heating rate from 1150° C. to 1275° C. is at least about 100° C./hr, to produce a body having a composition consisting essentially of in wt. % of about 49% to 53% SiO2, about 33% to 38% Al2O3 and about 12% to 16% MgO and having one of the following sets of properties: a mean coefficient of thermal expansion at 25–800° C. of <4×10-7C-1 and a total porosity of <20%, a mean coefficient of thermal expansion of >4×10-7C-1 but <9×10-7C-1 and a total porosity of <12%, a mean coefficient of thermal expansion of >9×10-7C-1 but <15×10-7C-1 and a porosity of <10%.

2. A method of claim 1 wherein the raw materials are of the first combination and the talc has a mean particle diameter of greater than about 3 micrometers, the kaolin has a mean particle diameter of less than about 2 micrometers, and the heating rate between 1150° C. and 1275° C. is less than about 100° C./hr.

3. A method of claim 1 wherein the raw materials are of the third combination and the talc has a mean particle diameter of less than about 3 micrometers, the kaolin has a mean particle diameter of less than about 2 micrometers, the amount of calcined kaolin is greater than about 15% by weight, and at least about 10% by weight of the Al2O3-forming material is provided in a form that readily disperses into particles of less than about 0.2 micrometers in diameter.

4. A method of claim 3 wherein said Al2O3-forming material that readily disperses into particles of less than about 0.2 micrometers in diameter is selected from the group consisting of boehmite, pseudo-boehmite aluminum oxide hydroxide, and combinations thereof.

5. A method of claim 1 wherein the raw materials are of the third combination and the talc has a mean particle diameter of less than about 3 micrometers, the kaolin has a mean particle diameter of greater than about 3 micrometers, and the amount of calcined kaolin is greater than about 15% by weight.

6. A cordierite body having a mean coefficient of thermal expansion at 25–800° C. of <4×10-7C-1 and a total porosity of <20%.

7. A cordierite body having a mean coefficient of thermal expansion of >4×10-7C-1 but <9×10-7C-1 and a total porosity of <12%.

8. A cordierite body having a mean coefficient of thermal expansion of >9×10-7C-1 but <15×10-7C-1 and a porosity of <10%.

* * * * *